Oct. 29, 1968 C. M. E. MASSON 3,408,640

READ-OUT CIRCUITRY FOR HIGH DENSITY DYNAMIC MAGNETIC STORES

Filed Sept. 13, 1965

United States Patent Office 3,408,640

Patented Oct. 29, 1968

3,408,640

READ-OUT CIRCUITRY FOR HIGH DENSITY DYNAMIC MAGNETIC STORES

Claude Marie Edmond Masson, Asnieres, France, assignor to Societe d'Electronique et d'Automatisme, Courbevoie, Hauts-de-Seine, France Filed Sept. 13, 1965, Ser. No. 486,658
Claims priority, application France, Oct. 8, 1964, 990,778
5 Claims. (Cl. 340—174.1)

ABSTRACT OF THE DISCLOSURE

A tapped two-branch delay line has its inputs connected to the outputs of a two-polarity read-out magnetic head for reading a high density magnetic record. The taps are evenly distributed on either side of a mid-tap in each branch of the delay line and calibrated summing resistances sum up the signals from said taps to a common output. The distribution of the taps and the calibration of the summing resistances together define a transfer function, from the head output to the said common input, which narrows the width of any bell-shaped alternating signal from the read-out head, consequently resetting the excursions through zero and peaks of the complete read-out waveform.

The present invention concerns improvements in or relating to the storing of binary coded information on magnetic carriers having a relative motion with respect to read-in and read-out heads, such as magnetic drums and tapes for computers and systems handling such kind of information.

In such information storing members, it is obviously of advantage to ensure an increased density of information for reaching a capacity of the store as large as possible for otherwise defined dimensions. An increase of said information density during a read-in operation does not involve any serious problem since it is easy to apply to a read-in head a waveform which is substantially rectangular and with such steep edges that such conditions produce on the magnetic carrier sudden reversals of its magnetization condition, so that the information bits are duly separated. Of course, the read-out operation must enable a thorough reproduction of such information bits, without any ambiguity nor risk of loss of any bit. However, the signal waveform from a read-out head is not at all rectangular because each reversal of magnetic condition on the carrier is translated into an amplitude variation which has a relatively wide bell shape. The superposition in time of such elementary waveforms, the polarities of which alternate, results in an overall waveform of too much irregularity in amplitude and phase for securely and correctly restituting said information bits when, on the magnetic carrier, a density of information is surpassed and the read-out operation can no longer ensure a separation of the said elementary waveforms. The physical conditions of the read-out operation consequently impede the provision of a high density of the information bits on the carrier.

It is an object of this invention to provide a read-out device for a magnetic tape or drum storage which, receiving from a read-out head a waveform of such an irregular shape that it would be improper for correct restitution of the information bits, translates such an improper waveform into a waveform of an amended shape adapted to be handled by normal restitution circuits for the correct restitution of the read-out information bits, consequently enabling the provision of a higher density of information to be obtained in the read-in operation of the information on such carriers.

Said device is provided for narrowing any elementary bell-shaped waveform issuing from the read-out head and its operation is based on the fact that such a modification of an elementary waveform produces ipso facto in a complex signal, the modification of any and all of the elementary waveforms existing in such a complex signal.

A further object of the invention is to provide such a device that it is specially simple and of great reliability.

The translation to ensure to any read-out elementary waveform, which is a function of time $f(t)$, in a device according to the invention, is to convert such a function $f(t)$ into a function of the kind $$f(t)-\alpha[f(t-\theta_1)+f(t-\theta_1')]+\beta[f(t-\theta_2)+f(t+\theta_2')]-\gamma[f(t-\theta_3)+f(t-\theta_3')]+\ \ldots$$

wherein the coefficients are lower than unity and the $\theta$ denotes determined time intervals which are fractions of the period T of the elementary waveform $f(t)$.

According to a feature of the invention, such a device comprises, connected to the output of the read-out head, a two-path delay line closed on its characteristic impedance and of a length at most equal to one period of any elementary waveform read-out by the head on the magnetic carrier in relative movement with it, a plurality of taps on said delay line on both sides of an intermediate midlength tap on one of the paths of said line, and a network summing the signals from said taps.

According to a further feature of the invention, the values of the resistances in said summing network which are connected to taps of the delay line on the sides of said mid-length tap are made lower than the value of the resistance connected to said mid-length tap and, further, are made of equal values by pairs symmetrical with respect to the mid-length of the delay line.

According to a further feature of the invention, an adjustable section of delay line is inserted between the read-out head and the above-mentioned delay line and said section is adjusted for ensuring a correction of the phase of the signal from said head with a determined timing and (or) for correcting a default of geometry of the read-out head which might apply waveforms of slightly different shapes to the two paths of said delay line.

These and other features will be described in detail with reference to the accompanying drawings, wherein.

Figure 1:
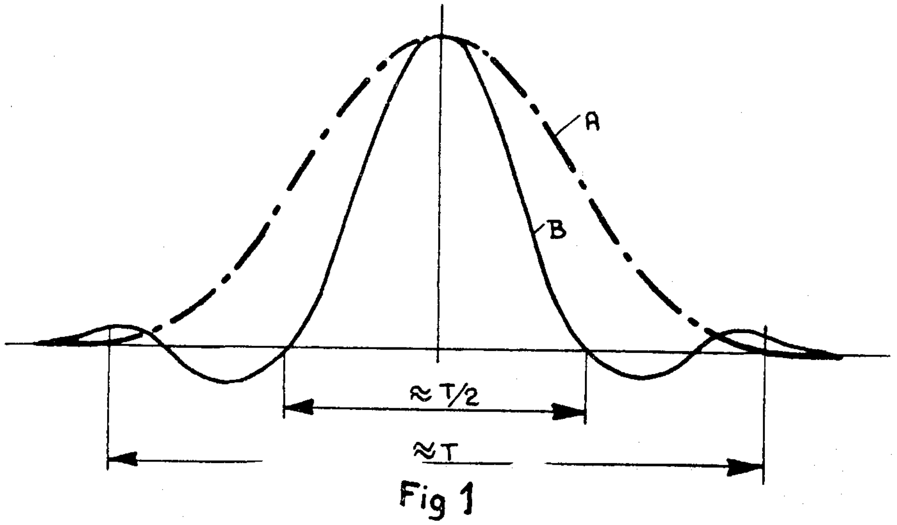
FIG. 1 shows graphs of an example of an elementary waveform issuing from a read-out head and an example of the waveform issuing from the device for the same element of the signal.
Figure 2:
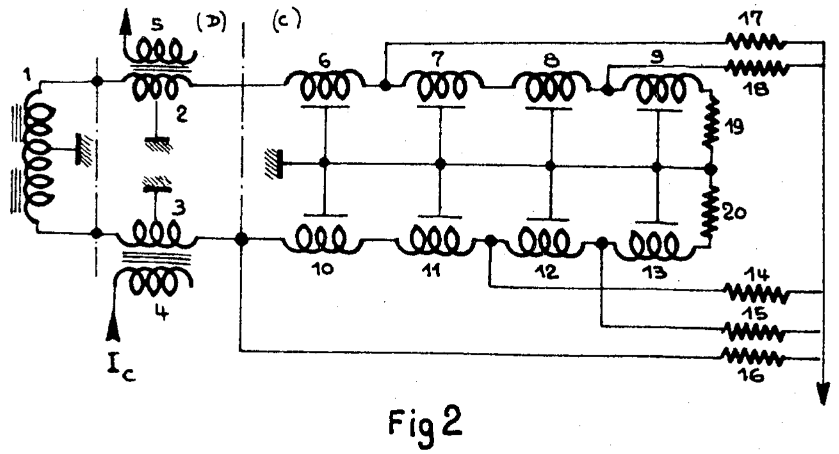
FIG. 2 shows an illustrative example of a device according to the invention, receiving the first above-mentioned waveform and delivering the second one of said waveforms in FIG. 1; and, FIG. 3 shows graphs displaying the action of the device of FIG. 2 on a complex waveform signal from the read-out head.
Figure 3:
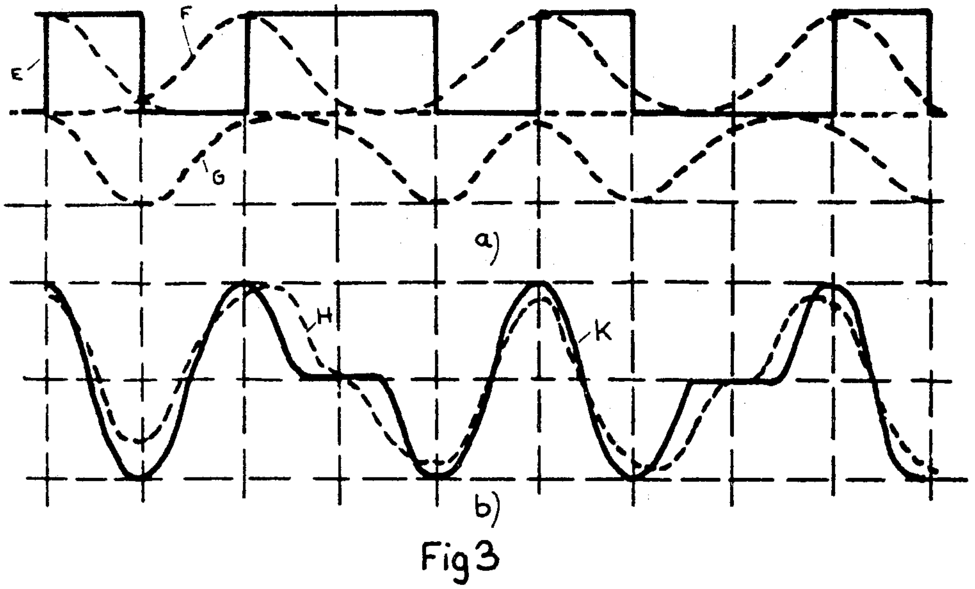

The waveform which is usually read-out from the head is such as shown by the graph A in FIG. 1, or any one of the waveforms marked in interrupted lines on the graph (*a*) of FIG. 3, wherein F shows the positive alternations, rising edges of the waveform E simulating both the read-in complex signal and the variations of magnetization of the carrier, and G shows the negative alternations of such a waveform E. The read-out elementary waveform is nearer a bell-shaped curve than a sine curve, and its period T, FIG. 1, may be defined for instance, with respect to that of the rectangular waveform E of FIG. 3. It may be seen that actually in a complex signal, the elementary waveforms partially overlap and, of course, the positive and negative alternations also partially overlap with respect to time. From the addition of the signals F and G is obtained a curve H, in dotted line in FIG. 3, graph ($b$) thereof, wherein the excursions through zero and the excursions through a maximum value are irregularly distributed with respect to the time. Accordingly, such a curve presents amplitude and phase distortions such that it is improper for a correct restitution of the binary information bits. The deformation of the complex signal read-out from the magnetic carrier comes from too high a density of the information at the read-in thereof with respect to the operation of the read-out head 1, FIG. 2, when the magnetic carrier moves in front of said head at the same speed as that of its motion before the read-in head (not shown), during read-in operation.

If such elementary waveform had the shape of the full line curve B of FIG. 1, that is to say a width between the main excursions to zero of the order of $T/2$ (or less), the information density as defined by the prior read-in operation would become quite acceptable since, in such a case, the complex signal from the read-out head would be such as shown in full line on the curve K of the graph ($b$) of FIG. 3, wherein the elementary amplitudes and phases are maintained in their correct values and positions, hence from which may be obtained a correct restitution of the binary information bits from the operation of circuits (not shown) which are quite conventional in themselves.

According to the invention, such a result is obtained, FIG. 2, by the insertion between the twin read-out head 1 and these unshown restitution circuits, of a two-path delay line (C) comprising two paths with identical delay sections 6–7–8–9 and 10–11–12–13 respectively closed on their characteristic impedances 19 and 20. On the path 10–13, a mid-length tap is connected to a resistance 14 of a summing network and, illustratively, two end taps connected to summing resistances 15 and 16. On the other path 6–9 two taps are provided on either side of the mid-length point of said path and connected to summing resistances 17 and 18. With reference to the above stated relation for the complex waveform and taking as unity the value of the summing resistance 14, the resistances 17 and 18 are made of a value $\alpha$ lower than said unity and the resistances 15 and 16 are made of a value $\beta$ lower than $\alpha$ (in the formula, the coefficients of the successive terms are of successively decreasing values). On the other hand, the values of the coefficients $\theta$ are of increasing percentages in the succession or sequence of said terms of the formula. In the example illustrated in FIG. 2, the formula is restricted to three terms, which suffices for the result of FIG. 1, but such an example is not limiting and other terms, that is further taps and summing resistances, may be provided for further narrowing any curve such as B and for further attenuating the slight end undulations of the curve around zero, hence a further possibility of increase of the density of the information on the magnetic carrier. In the illustrated example, further, $\theta_1=\theta_1'$, $\theta_2=\theta_2'$, though they may be made different by providing taps unevenly spaced from the mid-length of the delay line, which would result in a curve B displaying an asymmetry with respect to its vertical axis.

The correspondence between the device and the function is easily understood: the term $f(t)$ is represented by the signal issuing from the mid-length tap and the resistance 14, the terms $\beta[f(t-\theta_2)]$ and $\beta[f(t-\theta_2')]$ are represented by the end taps on the same branch or path as said mid-length tap and the resistances 16 and 15 respectively, and the terms $-\alpha[f(t-\theta_1)]$ and $-\alpha[f(t-\theta_1')]$ are represented by the signals issuing from the taps on the other path of the delay line and the resistances 17 and 18 respectively, hence, at the output of the summing network, a complex signal the shape of which is shown at K on the graph ($b$) of FIG. 3.

Between the outputs of the head 1 and the inputs of the paths of the delay line (C) is preferably though not imperatively connected a section of adjustable delay line. The delay adjustment being for instance provided from the flow of a direct current of appropriate value within windings 4 and 5 inductively coupled to the inductances of the elements of delay line 2 and 3. The adjustment of $I_c$ thus enables the adjustment of the delay, which is only a small fraction of the period T. Such an arrangement provides, when necessary, the due phasing of the output of the translating device with a timing of the following circuits which receive the signal from the summing network in order to handle it in view of the restitution of the information bits. This correction is mainly useful for magnetic drums, or it provides, when necessary, a correction of an asymmetry of geometry of the read-out head, mainly for a read-out from a magnetic tape, so that the two paths of the delay line may be fed with in-phase signals from the head.

What is claimed is:

1. Device for processing a complex signal from a two-polarity read-out head associated with a moving magnetic carrier of a binary coded information store in order to convert said signal into a signal suitable for restituting binary information bits previously stored at high density on said carrier, comprising: a two branch delay line having its branches respectively connected at one of their ends to the respective outputs of the read-out head and respectively closed at their other ends on their characteristic impedance; a plurality of taps on said branches, one of said taps being at mid-length on one of said branches and the other taps being distributed in pairs on either side of the mid-length of said line; and a corresponding plurality of summing resistances connected at one end to said taps and connected together at their other ends to a common output terminal.

2. Device according to claim 1, wherein a length of an adjustable delay line is connected between the said read-out head and the said delay line provided with said taps.

3. Device according to claim 1, wherein the distribution of said taps and the values of said resistances are provided in accordance with the development of the function $$f(t)-\alpha[f(t-\theta_1)+f(t-\theta_1')]\beta[f(t-\theta_2)+f(t-\theta_2')]-\gamma[f(t-\theta_3)+f(t-\theta_3')]+\ldots$$

wherein $f(t)$ denotes the signal issuing from said mid-length tap, the coefficients $\alpha$, $\beta$, $\gamma$, . . . are lower than unity and applied to the values of the resistances of the lateral taps with respect to the value of the resistance connected to said mid-length tap made as unity, and the $\theta$'s alternate from branch to branch of the delay line as denoting the spacings of the lateral taps with respect to the mid-length of the line.

4. Device according to claim 1, wherein the said resistances have values which are lower for the taps on either side of the mid-length of said delay line than the value of the resistance connected to said mid-length tap with decreasing values as the taps to which they are connected are farther from the mid-length of said delay line.

5. Device according to claim 4, wherein the spacings of said taps alternate from one branch of said delay line to the other one from the mid-length of said delay line.

References Cited

UNITED STATES PATENTS

| | | | |
|---|---|---|---|
| 3,331,079 | 7/1967 | Reader | 340—174.1 |
| 3,323,115 | 5/1967 | Sims | 340—174.1 |
| 3,271,750 | 9/1966 | Padalino | 340—174.1 |

BERNARD KONICK, *Primary Examiner.*

A. I. NEUSTADT, *Assistant Examiner.*